(12) United States Patent
Walters et al.

(10) Patent No.: US 11,517,872 B2
(45) Date of Patent: *Dec. 6, 2022

(54) ENCAPSULATION METHOD

(71) Applicant: CALYXIA, Bonneuil-sur-Marne (FR)

(72) Inventors: Jamie Dean Walters, Paris (FR); Jérôme Bibette, Paris (FR)

(73) Assignee: CALYXIA, Paris (FR)

( * ) Notice: Subject to any disclaimer, the term of this patent is extended or adjusted under 35 U.S.C. 154(b) by 232 days.

This patent is subject to a terminal disclaimer.

(21) Appl. No.: 16/911,778

(22) Filed: Jun. 25, 2020

(65) Prior Publication Data

US 2020/0324263 A1 Oct. 15, 2020

Related U.S. Application Data

(63) Continuation of application No. 15/546,033, filed as application No. PCT/EP2016/051660 on Jan. 27, 2016, now Pat. No. 10,786,798.

(30) Foreign Application Priority Data

Jan. 27, 2015 (FR) ...................................... 1550617

(51) Int. Cl.
*B01J 13/16* (2006.01)
*B01J 13/20* (2006.01)

(52) U.S. Cl.
CPC ............. *B01J 13/16* (2013.01); *B01J 13/203* (2013.01)

(58) Field of Classification Search
CPC ........ B01J 13/16; B01J 13/203; B01J 13/025; C08F 2/22; C08F 2/48
See application file for complete search history.

(56) References Cited

U.S. PATENT DOCUMENTS

| | | | |
|---|---|---|---|
| 6,251,661 B1 * | 6/2001 | Urabe | B01J 13/04 |
| | | | 435/6.15 |
| 2005/0080151 A1 | 4/2005 | Miki et al. | |
| 2014/0155295 A1 * | 6/2014 | Hindson | B01L 3/523 |
| | | | 506/30 |

FOREIGN PATENT DOCUMENTS

| | | | | |
|---|---|---|---|---|
| CN | 101053810 | 10/2007 | | |
| CN | 104168994 | 11/2014 | | |
| JP | 2012067181 | 4/2012 | | |
| KR | 20140070139 | 6/2014 | | |
| WO | WO-2004041251 A1 * | 5/2004 | ............. | A23L 27/72 |
| WO | WO-2013132083 A1 * | 9/2013 | ............. | A23P 10/30 |
| WO | WO-2014016367 | 1/2014 | | |

* cited by examiner

*Primary Examiner* — Irina S Zemel
(74) *Attorney, Agent, or Firm* — B. Aaron Schulman, Esq.; Stites & Harbison, PLLC (57) ABSTRACT

The present invention relates to a method for preparing solid capsules comprising a compound A, dispersed in a composition C4. The invention also relates to an encapsulation method, to the capsules obtained by this method, to a composition comprising them, as well as to a method using such capsules.

18 Claims, 3 Drawing Sheets

ENCAPSULATION METHOD

CROSS-REFERENCE TO RELATED APPLICATIONS

This application is a continuation of U.S. application Ser. No. 15/546,033, having a filing date of Jul. 25, 2017, which is a 371 application of International Patent Application PCT/EP2016/051660, filed Jan. 27, 2016, which claims the benefit of French application 1550617, filed Jan. 27, 2015, all of said applications incorporated herein by reference.

FIELD OF THE INVENTION

The present invention relates to an encapsulation method, to the capsules obtained by this method, to a composition comprising them, as well as to a method using such capsules.

BACKGROUND OF THE INVENTION

Within the scope of a chemical reaction on an industrial scale, for providing the reagents required for said reaction, it is often necessary to isolate a reagent from another reagent (or from a reaction mixture) up to the moment when the use of this reagent is desired. It is actually desirable that a given reagent be introduced at the right time in a medium in order to optimize the chemical reaction which has to take place.

Generally, this problem is solved by providing each reagent in separate conditionings, and by mixing the different reagents together at the moment of the reaction. This solution nevertheless has drawbacks. Thus, each reagent requires to be stored in a separate conditioning, which increases the costs associated with these conditionings, the overall weight of the reagents to be supplied, and therefore the distribution costs. Further, with the purpose of nevertheless trying to minimize these costs in spite of the various conditionings, large conditionings are used for storing these reagents, which forces the user to measure accurately the amount of each required reagent during the application of the reaction which one wishes to carry out. This constraint may generate measurement errors and thus variations in the properties of the final product of the reaction.

Another contemplated solution was to encapsulate the reagents in order to isolate them completely and to release them on command at the selected moment for applying the reaction. However, the methods proposed for encapsulating the reagents in bulk, prove to be unsatisfactory for completely confining, without any contamination or leak, said reagents in the bulk.

More recently, the chemical industry has contemplated the use of microfluidics for more efficiently encapsulating the reagents. Microfluidics may in principle be used for this application, but the technical constraints of this technique are presently not compatible with the imposed production rate and the flexibility required by the industrial production requirements.

The proposed encapsulation methods up to now do not give the possibility of meeting the constraints imposed by the production of chemical products on an industrial scale.

Therefore there exists a need for a more efficient means for providing reagents with the purpose of carrying out a chemical reaction, in particular on an industrial scale.

SUMMARY OF THE INVENTION

An object of the present invention is to provide a method for encapsulating a compound, typically a reagent, giving the possibility of completely isolating said compound from the outside medium, which does not have the drawbacks of the existing means.

The present invention also has the object of providing such a method further giving the possibility of triggering on command the release of the encapsulated compound, for example so that it reacts with another compound present in the outside medium.

In particular, the object of the present invention is to provide a method for conditioning two compounds, typically two reagents, within a same formulation, giving the possibility of isolating a first compound from a second compound, without the latter reacting with each other.

The present invention is based on an encapsulation method, which gives the possibility of meeting the technical problems above and which do not have the drawbacks of the existing encapsulation methods.

DETAILED DESCRIPTION

According to a first object, the present invention relates to a method for preparing solid capsules, comprising the following steps:
  a) addition with stirring of a composition C1 comprising at least one compound A, in a liquid composition C2 comprising a thermo-expansible material,
    C1 and C2 not being miscible with each other,
    C2 being at a temperature T2,
    whereby an emulsion is obtained comprising drops of composition C1 dispersed in the composition C2,
  b) addition with stirring of the emulsion obtained in step a) in a liquid composition C3 able to be polymerized,
    C3 and C2 not being miscible with each other,
    C3 being at a temperature T3, preferably equal to T2,
    whereby an emulsion is obtained comprising drops dispersed in the composition C3,
  c) addition with stirring of the emulsion obtained in step b) in a liquid composition C4,
    C4 and C3 not being miscible with each other,
    C4 being at a temperature T4 of less than or equal to T2 and less than or equal to T3,
    whereby an emulsion is obtained comprising drops dispersed in the composition C4, and
  d) polymerization of the drops obtained in step c), whereby solid capsules dispersed in the composition C4 are obtained.

The release of the compound A contained in the solid capsules obtained according to the method of the invention is initiated by a rise in temperature, which causes a thermal expansion of the thermo-expansible material of the composition C2, which causes a rupture of the polymerized rigid casing of the capsules (which, itself, cannot expand thermally because of the polymerization). This aspect of the invention will be detailed later on.

The method of the invention has the particularity of not requiring any intermediate evaporation steps, between the different steps a), b), c) and d) mentioned above (which will be described hereafter in detail).

The method according to the invention is also advantageous in that it is a "batch" method. Indeed, the latter may be conducted by carrying out the different steps a), b), and d) mentioned above in a single container.

Moreover, this method essentially consists in standard emulsification steps which may be carried out without adding any surfactants. Now, in spite of the absence of surfactants, the obtained emulsions are stable.

Further, the method according to the invention gives the possibility of doing without microfluidic steps for controlling the sizes of the obtained products.

The steps of the method of the invention will now be described in detail.

Method

Step a)

During step a), a composition C1, typically liquid is added preferably drop wise to a liquid composition C2 brought to the temperature T2.

At temperature T2, the compositions C1 and C2 are not miscible with each other, i.e. at this temperature, the composition C1 is not solid in the composition C2, and vice versa. More specifically by "C1 and C2 are not miscible with each other", is meant that at a given temperature, the amount (by mass) of C1 capable of being solubilized in C2 is less than or equal to 5%, preferably less than or equal to 1%, preferably less than or equal to 0.5% based on the total mass of C2, and that the amount (by mass) of C2 capable of being solubilized in C1 is less than or equal to 5%, preferably less than or equal to 1%, preferably less than or equal to 0.5%, based on the total mass of C1.

Thus, when it comes into contact with the composition C2 with stirring, the composition C1 is dispersed as drops, said to be simple drops.

The composition C2 is stirred so as to form a liquid-liquid emulsion comprising drops of composition C1 dispersed in the composition C2. This emulsion is also called a "simple emulsion" or emulsion C1-in-C2.

In order to apply step a), any type of stirrer usually used for forming emulsions may be used, such as for example a homogenizer with ultrasonic waves, a homogenizer with a membrane, a homogenizer at high pressure, a colloidal mill, a disperser with a high shearing power or a homogenizer of high speed.

The composition C1 comprises at least one compound A. This composition C1 is used as a carrier for the compound A in the method of the invention, within drops formed during the method of the invention and within obtained solid capsules.

According to a first alternative of the method of the invention, the composition C1 is a single phase composition, i.e. this is the compound A pure or else a solution comprising the compound A in a solubilized form.

According to this alternative, the composition C1 typically consists in a solution of the compound A in an organic solvent, or a mixture of organic solvents, the compound A being present according to a mass content comprised from 1% to 99%, based on the total mass of the composition C1. The compound A may be present according to a mass content comprised from 5% to 95%, from 10% to 90%, from 20% to 80%, from 30% to 70%, or from 40% to 60%, based on the total mass of the composition C1.

According to an embodiment, the composition C1 consists in the compound A.

According to this alternative, in the drops formed at the end of step a), the compound A present in the composition C1 is directly in contact with the casing of the composition C2. Nevertheless, because of the immiscibility between the composition C1 and the composition C2, the compound A remains confined in the core of the drops.

Figure 1:
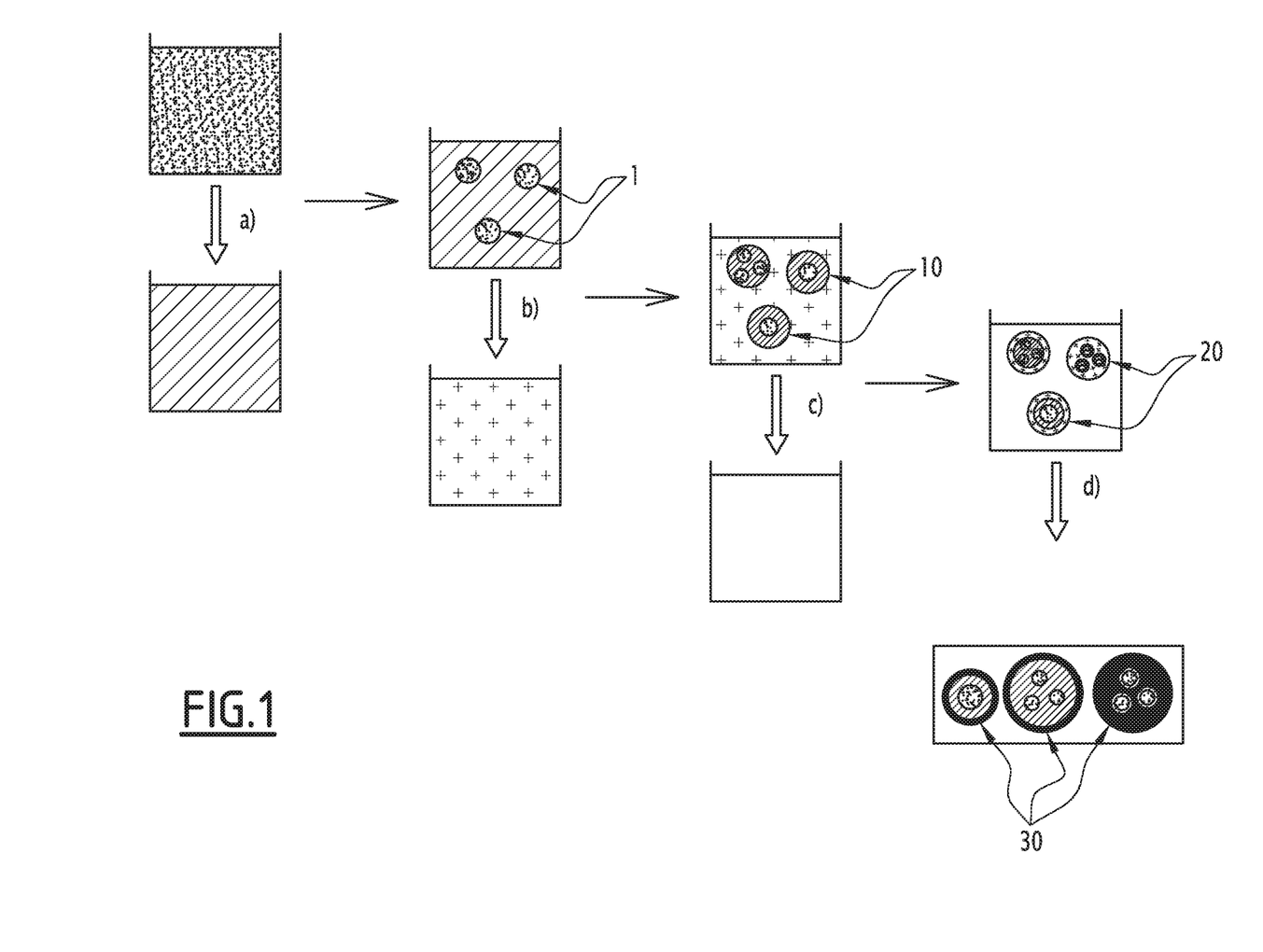
FIG. 1 schematically represents an embodiment of the first alternative of the method of the invention.

FIG. 1 illustrates schematically a method according to this alternative of the invention and notably schematically illustrates drops 1 obtained at the end of step a) and the solid capsules 30 obtained in fine according to this alternative of the method.

According to a second alternative of the method of the invention, the composition C1 is biphasic and comprises in addition to the compound A, a liquid composition C'3 able to be polymerized, said composition C'3 preferably corresponding to the composition C3 used during the subsequent step b).

According to this alternative, the composition C1 is an emulsion formed with drops of a solution comprising the compound A in a solubilized form, said drops being dispersed in the composition C'3. The solution comprising the compound A typically consists in a solution of the compound A in an organic solvent or a mixture of organic solvents. This solution typically comprises from 1% to 99%, or even from 5% to 95%, from 10% to 90%, from 20% to 80%, from 30% to 70%, or from 40% to 60% of compound A based on the total mass of said solution.

The composition C'3 is typically present in the composition C1 according to a mass content comprised from 1% to 50%, or even from 10% to 40%, or from 20% to 30%, based on the total mass of said composition C1.

Such a composition C1 is typically obtained by dispersing, with stirring a solution comprising the compound A in a solubilized form in a liquid composition C'3, said solution and said liquid composition C'3 not being miscible with each other.

According to this alternative, the drops formed at the end of step a) typically comprise a core comprising the compound A and a liquid casing of composition C'3 positioned around said core, said drops being dispersed in the composition C2.

By "casing positioned around said core", is meant that the casing surrounds, preferably totally, said core so that the latter cannot escape from the enclosure formed by said casing. Preferably, the casing which surrounds said core is positioned in contact with said core. It is also stated that the core is "encapsulated" in the casing.

The solid capsules obtained at the end of step d) of the method according to this alternative thereby comprise two polymerized rigid casings: an internal one in contact with the core containing the compound A, and the other external one in the periphery.

Figure 2:
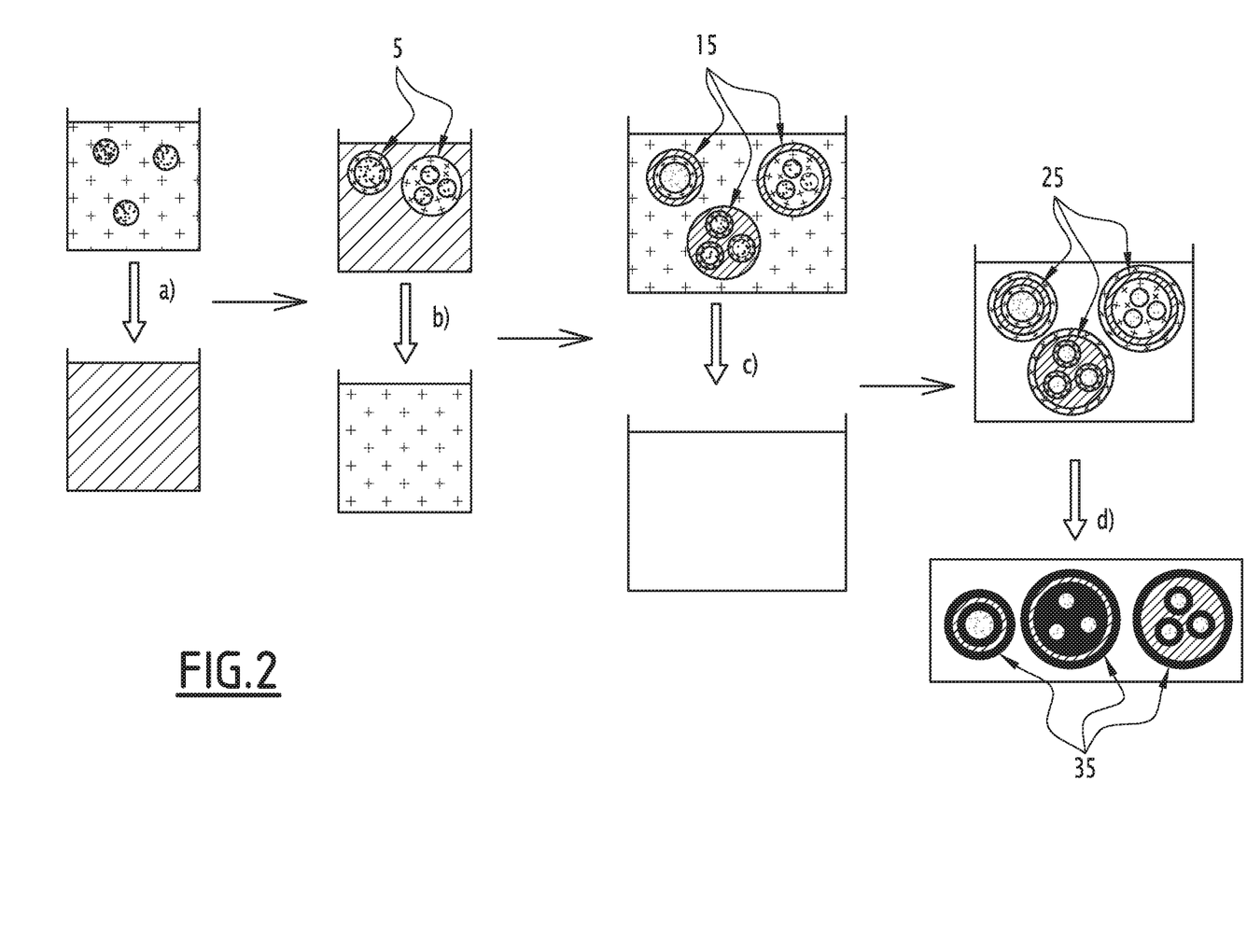
FIG. 2 schematically represents an embodiment of the second alternative of the method of the invention.

FIG. 2 represents in a schematic way a method according to this alternative of the invention and notably represents schematically drops 5 obtained at the end of step a) and solid capsules 35 obtained in fine according to this alternative of the method.

According to a third alternative of the method of the invention, steps a) and b) are repeated at least once after step b) and before step c).

The sequence of the steps of the method according to this alternative is thus a)-b)-a)-b)- . . . -c)-d).

The solid capsules obtained at the end of step d) thereby comprise at least two polymerized rigid casings. Protective layers are thereby multiplied between the core and the external medium, which suppresses any risk of an undesired leak of the compound A.

Figure 5:
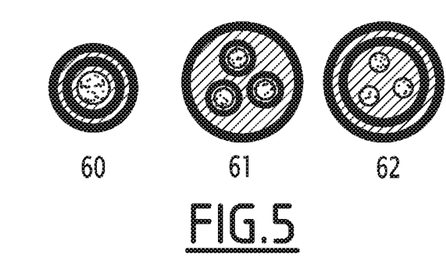
Figure 6:
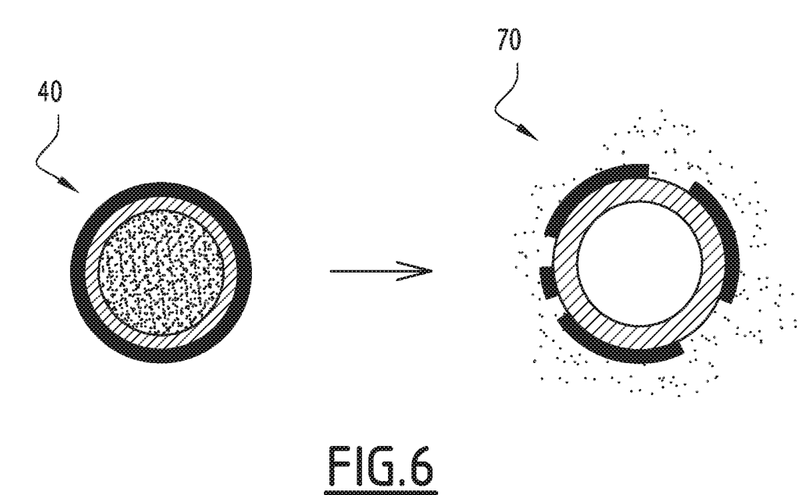
FIG. 6 schematically represents the fragmentation of a solid capsule 40 according to the invention into a fragmented capsule 70, caused by the heating of said capsule 40 for triggering the release of the compound A contained in its core. The increase in the temperature causes thermal expansion of the internal casing of composition C2, which causes fragmentation of the polymerized rigid external casing allowing the compound A to escape.

FIG. 5 schematically represents solid capsules obtained in fine according to this alternative of the method.

The compound A is for example a coloring agent, a perfume (as listed by IFRA), a pigment like titanium dioxide, a care active, such as for example proteins, vitamins, plant extracts, amino acids, lipids, or a bioactive compound like an enzyme.

The compound A may also be a reagent capable of reacting with another reagent contained in the composition comprising the capsules of the invention. This aspect of the invention will be more tackled in depth hereafter.

The composition C2 comprises a thermo-expansible material.

Within the scope of the present invention, by "thermo-expansible material" is meant a solid or liquid material at room temperature (i.e. between 20° C. and 25° C.), for which the volume varies reversibly according to its temperature. In other words, a thermo-expansible material thermally expands when its temperature increases and contracts when its temperature decreases. This property is quantified by its thermal volume expansion coefficient, expressed in $K^{-1}$, and determined at a given temperature.

Preferably, the thermo-expansible material of the invention has a thermal volume expansion coefficient greater than or equal to $1.10^{-4}$ $K^{-1}$, in a range of temperatures comprising the temperature at which the release of the compound A is intended to be triggered, for example at the temperature of 20° C.

When a sample of a material occupying a volume $V_0$ at temperature $T_0$ is heated to a temperature $T_f$ where it then occupies a volume $V_f$, the thermal expansion coefficient cc is defined by:

$$\alpha = \frac{V_f - V_0}{V_0(T_f - T_0)}$$

Before adding the composition C1, the composition C2 is brought to a temperature T2 such that the thermo-expansible material is in a liquid form (or molten).

The temperature T2 may be adapted according to the physico-chemical characteristics of the thermo-expansible material, but preferably remains greater than or equal to the melting point of said thermo-expansible material.

According to an embodiment, the composition C2 is in solid (or set) form at room temperature and in a liquid form (or molten) at the temperature T2. This is typically the case when the thermo-expansible material has a melting point greater than room temperature, such as for example a solid wax at room temperature.

According to another embodiment, the composition C2 is in liquid form at room temperature and in liquid (or molten) form at the temperature T2. This is typically the case when the thermo-expansible material has a melting point of less than room temperature, like for example a liquid fluorocarbon at room temperature.

These particular embodiments will be detailed hereafter.

At temperature T2, the composition C2 is liquid and typically has a viscosity greater than or equal to 1 cP, preferably comprised from 1 cP to 10,000 cP, preferentially comprised from 10 cP to 1,000 cP, for example of the order of 100 cP.

The viscosity is for example measured by means of a rheometer HAAKE™ RheoStress 600, at temperature T2.

Preferably, at temperature T2, the composition C2 is more viscous than the composition C1. This gives the possibility of an improved formation of the emulsion of C1-in-C2, without any coalescence phenomenon of droplets of composition C1.

The temperature T2 is typically greater than or equal to 10° C., preferably greater than or equal to 20° C., advantageously comprised from 30° C. to 200° C., preferentially comprised from 30° C. to 100° C.

The temperature T2 is for example comprised from 20° C. to 40° C.

Preferably, T2 is such that it does not alter the constituents of the composition C2 or of the composition C1, and/or that it does not cause evaporation of the solvents optionally present in the composition C1.

The thermo-expansible material is typically present according to a content from 1% to 100%, preferably from 10% to 90%, preferentially from 30% to 70%, by weight based on the total weight of the composition C2.

According to an embodiment, the thermo-expansible material is selected from the group consisting of waxes, fluorocarbons, and mixtures thereof.

According to a preferred embodiment, the thermo-expansible material is a wax or a mixture of waxes.

The relevant wax(es) within the scope of the invention is (are) generally a lipophilic compound, solid at room temperature (between 20° C. and 25° C.), with a reversible state transition solid/liquid, having a melting point greater than or equal to 30° C. which may range up to 200° C. and notably up to 120° C.

The waxes are thermo-expansible materials, which thermally expand notably (but not only) during their state transitions solid→liquid.

When the thermo-expansible material is selected from the group consisting of waxes, T2 is preferably greater than or equal to the melting point of said wax, so that the composition C2 is liquid at temperature T2. In this case, T4 is preferably less than or equal to the melting point of said wax, so that, in the drops obtained at the end of step c), and in the solid capsules obtained at the end of step d), the composition C2 is in a solid form.

The release of the encapsulated compound A is in this case typically initiated by subjecting the capsules to a temperature greater than or equal to the melting point of the wax used as a thermo-expansible material. The state transition solid 4 liquid of the wax causes a thermal expansion of the composition C2 and thus a rupture of the polymerized rigid casing of the capsules.

The waxes suitable for the invention may have a melting point greater than or equal to 35° C., in particular greater than or equal to 40° C., preferably greater than or equal to 45° C., preferentially greater than or equal to 50° C., advantageously greater than or equal to 60° C., or even greater than or equal to 70° C., or further than 80° C., than 90° C., than 100° C., than 110° C., or than 150° C.

In the sense of the invention, the melting point (or melting temperature) corresponds to the most endothermic peak temperature observed in thermal analysis (DSC) as described in the ISO 11357-3 standard; 1999. The melting point of the wax may be measured by means of a differential scanning calorimeter (DSC), for example the calorimeter sold under the name of "DSC Q2000" by TA Instruments.

The wax(es) may be hydrocarbon, fluorinated and/or silicone waxes and of plant, mineral, animal and/or synthetic origin. It is also possible to use a mixture of waxes, of an identical or different type.

Preferably, hydrocarbon waxes like beeswax, lanoline wax, and Chinese insect waxes, rice wax, Carnauba wax, Candellila wax, Ouricurry wax, Alfa wax, Esparto wax, cork fiber wax, cane sugar wax, orange wax and lemon wax, shellac wax, Japanese wax and sumac wax, lignite wax, microcrystalline waxes, waxes of paraffins and ozokerite, polyethylene waxes, waxes obtained by the Fisher-Tropsch synthesis and waxy copolymers as well as their esters.

Mention may also be made of polyvinyl ether waxes, waxes based on cetyl palmitate, waxes of the glycerol ester and fatty acid type, waxes of ethylene copolymers, waxes of oxidized polyethylene, ethylene homopolymer waxes, polyethylene waxes, polyether waxes, ethylene/vinyl acetate copolymer waxes and polypropylene waxes.

Mention may also be made of waxes obtained by catalytic hydrogenation of animal or plant oils having linear or branched $C_8$-$C_{32}$ fatty chains.

Among the latter, mention may notably be made of isomerized jojoba oil, hydrogenated sunflower oil, hydrogenated castor oil, hydrogenated coprah oil and hydrogenated lanoline oil.

Further mention may be made of silicone waxes like alkyl or alkoxy-dimethicone having from 16 to 45 carbon atoms, fluorinated waxes.

It is also possible to use the wax obtained by hydrogenation of olive oil esterified with fatty acids or else further the waxes obtained by hydrogenation of castor oil esterified with fatty acids.

These waxes may be used separately or as a combination for adjusting the properties, such as the viscosity and the melting point of the thermo-expansible material.

As waxes which may be used, mention may be made of hydrocarbons (n-alkanes, branched alkanes, olefins, cyclic alkanes, isoprenoïdes), ketones (monoketones, β-diketones), secondary alcohols, alkanediols (alkane-1,2-diols, alkane-2,3-diols, alkane-α,ω-diols), acids (alkenoic acid and alkanoic acid), ester waxes (esters of a primary alcohol and esters of a secondary alcohol), diester waxes (diesters of alkanediol, diesters of hydroxylacids), triester waxes (triacylglycerols, triesters of alkane-1,2-diol, of ω-hydroxy acid and of fatty acid, esters of hydroxymalonic acid, of fatty acid and of alcohol, triesters of hydroxylacids, of fatty acid and of fatty alcohol, triesters of fatty acid, of hydroxylacid and of diol) and polyester waxes (polyesters of fatty acids).

For example mention may be made of n-octacosane, n-heptacosane, n-hexacosane, n-pentacosane, n-tetracosane, n-tricosane, n-docosane, n-heneicosane, n-eicosane, n-nonadecane, myristyl alcohol, pentadecyl alcohol, cetyl alcohol, palmitoleyl alcohol, heptadecyl alcohol, stearyl alcohol, nonadecyl alcohol, arachidyl alcohol, heneicosyl alcohol, behenyl alcohol, erucyl alcohol, lignoceryl alcohol, ceryl alcohol, 1-heptacosanol, montanyl alcohol, cluytyl alcohol, 1-octacosanol, 1-nonacosanol, myricylic acid, melissyl alcohol, 1-triacontanol and 1-dotriacontanol.

The fatty acids which may be used as waxes within the scope of the method of the invention are for example cerotic acid, palmitic acid, stearic acid, behenic acid, lignoceric acid, arachidic acid, myristic acid, lauric acid, tridecyclic acid, pentadecyclic acid, margaric acid, nonadecyclic acid, heneicosylic acid, tricosylic acid, pentacosylic acid, heptacosylic acid, montanic acid, and nonacosylic acid.

The esters of fatty acids which may be used as waxes within the scope of the method of the invention are for example cetyl palmitate, cetyl octanoate, cetyl laurate, cetyl lactate, cetyl isononanoate, cetyl stearate, stearyl stearate, myristyl stearate, cetyl myristate, isocetyl stearate, glyceryl trimyristate, glyceryl tripalmitate, glyceryl monostearate and glyceryl and cetyl palmitate.

The use of a wax has the advantage of being able to adapt the thermo-expansible material depending on the desired use of the capsules obtained by le method of the invention. Indeed it is possible to select the wax used according to its melting point and to the desired release temperature.

If one wishes to encapsulate the compound A below 35° C. and to release it when the temperature attains this threshold temperature, it is possible to use a paraffinic wax (melting temperature of the order of 37° C.).

For a release at 40° C., it is possible to use SUPPOCIRE® DM from GATTEFOSSE (melting temperature of the order of 42° C.).

For a release at 45° C., it is possible to use a polyvinyl ether wax (melting point of the order of 47° C.).

For a release at 50° C., it is possible to use a wax based on cetyl palmitate (melting point of the order of 54° C.).

For a release at 60° C., it is possible to use beeswax (melting point of the order of 62° C.).

For a release at 65° C., it is possible to use Candelilla wax (melting point of the order of 68° C.).

For a release at 75° C., it is possible to use rice bran wax (melting point of the order of 77° C.).

For a release at 80° C., it is possible to use carnauba wax (melting point of the order of 82° C.) or lignite wax (melting point of the order of 82° C.) or shellac wax (melting point of the order of 80-100° C.).

For a release at 90° C., it is possible to use a ethylene copolymer wax (melting point of the order of 90° C.) or an oxidized polyethylene wax (melting point of the order of 94° C.).

For a release at 100° C., it is possible to use an ethylene homopolymer wax (melting point of the order of 100° C.).

For a release at 110° C., it is possible to use a polyethylene wax (melting point of the order of 110° C.) or an ethylene/vinyl acetate copolymer wax (melting point of the order of 110° C.).

For a release at 160° C., it is possible to use a polypropylene wax (melting point of the order of 160° C.).

The waxes mentioned above may be modified so as to adjust their melting point.

For example, the paraffin wax may be in C-18 (28° C.), in C-20 (37° C.) or in C-34 (76° C.).

According to a particular embodiment, the thermo-expansible material comprises a wax selected from among the group consisting of mono-, di- and tri-esters of glycerol and of fatty acids having a linear or branched hydrocarbon chain comprising from 8 to 24 carbon atoms, and mixtures thereof, preferably from the group formed by glycerol trimyristate, glycerol tripalmitate, glycerol monostearate, glycerol cetylpalmitate and mixtures thereof.

According to a particular embodiment, the thermo-expansible material further comprises phosphatides derived from lecithin, like for example phosphatidylcholine and phosphatidylethanilamine.

As a thermo-expansible material which may be used within the scope of the present invention, mention may notably be made of the wax SUPPOCIRE® DM Tablets from GATTEFOSSE.

According to another preferred embodiment, the thermo-expansible material is a fluorocarbon.

A fluorocarbon considered within the scope of the present invention is generally an organic compound in which at least one portion of the hydrogen atoms are replaced with fluorine atoms.

A considered fluorocarbon is for example an organic compound wherein all the hydrogen atoms are replaced with fluorine atoms, this is then referred to as a perfluorocarbon.

The fluorocarbons may be solid or liquid at room temperature (between 20° C. and 25° C.), or even have a boiling point of less than or equal to 200° C.

The fluorocarbons are thermo-expansible materials, which expand thermally notably during their transitions from a solid state→liquid state and/or liquid state gas state.

According to an alternative, the thermo-expansible material is a solid fluorocarbon at room temperature (between 20° C. and 25° C.).

According to this alternative, T2 is preferably greater than or equal to the melting point of the fluorocarbon.

According to this alternative, the release of the encapsulated compound A is typically initiated by subjecting the capsules to a temperature greater than or equal to the melting point of the fluorocarbon used as a thermo-expansible material. The state transition from solid→liquid of the fluorocarbon causes thermal expansion of the composition C2 and thus a rupture of the polymerized rigid casing.

According to another alternative, the thermo-expansible material is a liquid fluorocarbon at room temperature (between 20° C. and 25° C.).

According to this alternative, T2 is typically equal to room temperature.

According to this alternative, T4 is also typically equal to room temperature.

According to this alternative, the release of the encapsulated compound A is typically initiated by subjecting the capsules to a temperature greater than the boiling point of the fluorocarbon used as a thermo-expansible material. The transition from a liquid state→to a gas state of the fluorocarbon causes a thermal expansion of the composition C2 and thus a rupture of the polymerized rigid casing.

The fluorocarbons suitable for the invention may have a melting point greater than or equal to 35° C., in particular greater than or equal to 40° C., preferably greater than or equal to 45° C., preferentially greater than or equal to 50° C., advantageously greater than or equal to 60° C., or even greater than or equal to 70° C., or further than 80° C., 90° C., or 100° C.

The fluorocarbons suitable for the invention may have a boiling point greater than or equal to 80° C., in particular greater than or equal to 90° C., preferably greater than or equal to 100° C., preferentially greater than or equal to 150° C., advantageously greater than or equal to 180° C.

For example mention may be made of fluorinated aromatic $C_6$-$C_{20}$ aromatic compounds, linear or cyclic fluorinated $C_6$-$C_{20}$ hydrocarbons, fluorinated $C_6$-$C_{20}$ unsaturated linear hydrocarbons, fluorinated $C_3$-$C_{20}$ esters (esters of formic acid, of acetic acid or of butyric acid), fluorinated $C_3$-$C_{20}$ ethers, fluorinated $C_3$-$C_{20}$ ketones, and fluorinated $C_3$-$C_{20}$ carbonates (ethylene carbonate, propylene carbonate, butylene carbonate, . . . ).

By "fluorinated", is meant that the organic compound bears at least one fluorine atom, typically 1 to 20 fluorine atoms, preferably from 2 to 10 fluorine atoms, for example from 3 to 10.

As an example, mention may be made ("mp" being the melting point and "bp" being the boiling point of the material):

fluorinated benzophenones, such as decafluorobenzophenone (bp: 206° C., mp: 92-94° C.) and 4,4'-difluorobenzophenone (bp: 170° C. (10 torrs), mp: 106-109° C.), fluorinated benzenes, such as hexafluorobenzene (bp: 80° C.), 1,3-bis(trifluoromethyl)benzene (bp: 116° C., mp: 35° C.), allylpentafluorobenzene (bp: 148-149° C., mp: 64° C.), 1,2,3,4-tetrafluorobenzene (bp: 95° C., mp: 42° C.), 1,2,3,5-tetrafluorobenzene (bp: 83° C., mp: 48° C.), 1,2,4,5-tetrafluorobenzene (bp: 90° C., mp: 4° C.), 1,2,3-trifluorobenzene (bp: 94-95° C.), 1,2,4-trifluorobenzene (bp: 88-91° C., mp: 12° C.), 1,3,5-trifluorobenzene (bp: 75-76° C., mp: 5.5° C.), 1,2-difluorobenzene (bp: 92° C., mp: 34° C.), 1,3-difluorobenzene (bp: 83° C., mp: 59° C.), 1,4-difluorobenzene (bp: 88-89° C., mp: 13° C.), fluorobenzene (bp: 85° C., mp: 42° C.), (trifluoromethoxy)benzene (bp: 102° C.), 1-ethynyl-4-fluorobenzene (bp: 55° C. (40 mmHg), mp: 27-28° C.), 1,4-bis(difluoromethyl)benzene (bp: 70° C. (2.7 kPa)), 1-acetoxy-4-fluorobenzene (bp: 197° C.), and 2,4,6-trimethylfluorobenzene (bp: 163-165° C.), fluorinated toluenes, such as octafluorotoluene (bp: 104° C., mp: 65.6° C.), α,α,α-trifluorotoluene (bp: 102° C., mp: 29° C.), 2,6-difluorotoluene (bp: 112° C.), o-fluorotoluene (bp: 114° C., mp: 62° C.), m-fluorotoluene (bp: 115° C., mp: 87° C.), p-fluorotoluene (bp: 116° C., mp: 53° C.), and 2,4-difluorotoluene (bp: 114-116° C.), fluorinated xylenes, such as 3-fluoro-o-xylene (bp: 148-152° C.), fluorinated naphthalenes, such as octafluoronaphthalene (bp: 209° C., mp: 87-88° C.) and 1-fluoronaphthalene (bp: 215-217° C., mp: 13° C.), fluorinated styrenes such as 2-fluorostyrene (bp: 29-30° C.) and 4-fluorostyrene (bp: 67° C. (50 mmHg), mp: 36° C.), fluorinated decalins such as perfluorodecalin (mixture of cis and trans, bp: 142° C., mp: 10° C.), linear or cyclic hydrocarbons, such as 1-fluorohexane (bp: 93° C.), perfluoro-1,3-dimethylcyclohexane (bp: 101-102° C., mp: 55° C.), 1-fluoropentane (bp: 62-63° C.), 1-fluorononane (bp: 166-169° C.), and perfluoro-2-methyl-2-pentene (bp: 53-61° C.), (perfluorobutyl)ethylene (bp: 58° C.), and fluorinated esters such as ethyl fluoroacetate (bp: 117° C.), ethyl 4,4,4-trifluoroacetoacetate (bp: 131° C., mp: 39° C.), and methyl 2-fluorophenylacetate.

Preferably, the fluorocarbon is selected from among the group consisting of 1,2-difluorobenzene, hexafluorobenzene, perfluoro-1,3-dimethylcyclohexane and o-fluorotoluene.

It is interesting to use a fluorocarbon as a thermo-expansible material in the case when a wax cannot be used, for example when it is desired to encapsulate a lipophilic compound which would be miscible with waxes.

Further, the use of a fluorocarbon having a relatively low boiling point (typically less than or equal to 120° C.) gives the possibility of easily suppressing by evaporation the thermo-expansible material, typically during the method for releasing the encapsulated compound A (this method will be detailed hereafter).

According to an embodiment, the composition C2 comprises, in addition to the thermo-expansible material, at least one polyolefin, preferably a poly-alpha-olefin.

Poly-alpha-olefins are a family of polyolefins (polyalkenes) stemming from olefins having a double bond in the alpha position.

The presence of a polyolefin in the composition C2 gives the possibility of advantageously adjusting its viscosity to the desired viscosity, and/or adjusting the melting point of the composition C2.

When the thermo-expansible material tends to crystallize when it is cooled, the use of a polyolefin advantageously gives the possibility of avoiding the formation of crystals and of obtaining spherical capsules.

As a polyolefin which may be used within the scope of the present invention, mention may notably be made of poly-alpha-olefin SYNTON® PAO 100 from CHEMTURA.

The polyolefin is typically present according to a content comprised from 5% to 60% by weight based on the total weight of the composition C2.

According to an embodiment, the composition C2 comprises, in addition to the thermo-expansible material, a liquid, aliphatic or aromatic hydrocarbon, either natural or synthetic, like for example a mineral oil.

The presence of a liquid hydrocarbon gives the possibility of advantageously diluting the thermo-expansible material, for adapting the viscosity of the composition C2.

Step b)

During step b), the emulsion obtained at the end of step a) is preferably added drop wise to a liquid composition C3 brought to temperature T3.

At temperature T3, the compositions C2 and C3 are not miscible with each other. Thus, when the emulsion C1-in-C2 comes into contact with the composition C3 with stirring, so called double drops are formed.

In FIGS. 1 and 2, the drops 10 and 15 are schematic representations of double drops which may be obtained.

Generally, a double drop formed corresponds to a simple drop formed earlier, surrounded with a casing of composition C2 positioned around said simple drop, said drops doubles being dispersed into the composition C3. The emulsion obtained is also called «a double emulsion» or a C1-in-C2-in-C3 emulsion.

According to an embodiment, a double drop formed corresponds to several simple drops formed earlier, surrounded with a single and same casing of composition C2 positioned around said simple drop, said double drops being dispersed into the composition C3.

Thus, the core of the double drops formed consists of one or several composition C1 drops.

The obtained emulsion is also called «a double emulsion» or a C1-in-C2-in-C3 emulsion.

Preferably, at temperature T3, the compositions C1 and C3 are not miscible with each other, notably in the case of the first alternative described above where the composition C1 is monophasic. This has the advantage of avoiding that the double drops formed destabilize in the case of rupture or destabilization of the casing of composition C2, which would cause a leak of the compound A and a contamination of the composition C3.

In order to apply step b), any type of stirrer usually used for forming emulsions, may be used such as for example a homogenizer with ultrasonic waves, a homogenizer with a membrane, a high pressure homogenizer, a colloidal mill, a disperser with a high shearing power or a homogenizer with a high speed.

Before addition of the C1-in-C2 emulsion, the composition C3 is brought to a temperature T3 such that the composition C3 is in liquid form.

At temperature T3, the composition C3 typically has a viscosity greater than or equal to 800 cP, preferably comprised from 800 cP to 150,000 cP, preferentially 10,000 cP to 60,000 cP.

Preferably, at temperature T3, the composition C3 is more viscous than the C1-in-C2 emulsion. This allows improved formation of the C1-in-C2-in-C3 emulsion, without any coalescence phenomenon of C1-in-C2 emulsion droplets.

The temperature T3 is typically greater than or equal to 10° C., preferably greater than or equal to 20° C., advantageously comprised from 30° C. to 200° C., preferentially comprised from 30° C. to 100° C.

The temperature T3 is for example equal to the temperature T2.

The temperature T3 is for example comprised from 20° C. to 40° C.

The temperature T3 may be adapted according to the cases, but is such that the composition C3 remains liquid at this temperature. Preferably, the temperature T3 is such that it does not alter the constituents of the compositions C1 or C2, and/or that it does not cause evaporation of the solvents optionally present in the composition C1.

The composition C3 is able to be polymerized.

Within the scope of the present invention, by "composition able to be polymerized" is meant a composition which polymerizes under certain conditions in order to form a solid and rigid material.

According to the invention, the polymerization corresponds to cross-linking. Preferably, this polymerization (or cross-linking) reaction is different from a coacervation reaction.

Coacervation corresponds to the formation of a complex within which the chemical species are bound together through reversible electrostatic bonds by simple modification of the solvent (for example a change in pH or in salt concentration). Now, comparatively, the cross-linking according to the invention corresponds to the formation of strong chemical bonds between the chemical species. These bonds can only be destroyed by destructive methods such as heating at a high temperature. Consequently, the properties of mechanical strength such as rigidity are much greater in a cross-linked material than in a coacervate.

According to an embodiment, the composition C3 comprises at least one unsaturated monomer or of an unsaturated pre-polymer, a cross-linking agent and a photo-initiator.

According to this embodiment, the composition C3 typically comprises from 50% to 95% by weight of unsaturated monomer or of an unsaturated pre-polymer, based on the total weight of said composition C3.

According to this embodiment, the composition C3 typically comprises from 1% to 20% by weight of a cross-linking agent, based on the total weight of said composition C3.

According to this embodiment, the composition C3 typically comprises from 0.1% to 5% by weight de photo-initiator, based on the total weight of said composition C3.

By "unsaturated monomer", is meant a monomer bearing at least one unsaturation, typically an ethylenic unsaturation, which may polymerize for providing a solid and rigid material.

As an unsaturated monomer, mention may notably be made of monomers bearing at least one (meth)acrylate function. These monomers may also bear one or several functions selected from among the group consisting of primary, secondary and tertiary alkylamine functions, quaternary amine functions, sulfate, sulfonate, phosphate, phosphonate, carboxylate, hydroxyl, halogen functions and mixtures thereof.

By "unsaturated pre-polymer", is meant a polymer or an oligomer bearing at least one unsaturation, typically an ethylenic unsaturation, which may polymerize for providing a solid and rigid material.

As an unsaturated pre-polymer, mention may notably be made of pre-polymers bearing (meth)acrylate functions, like polyurethanes, polyesters, polyureas, polyethers, and polydimethylsiloxanes, bearing (meth)acrylate functions.

By "cross-linking agent", is meant a compound bearing at least two reactive functions which may cross-link an unsaturated monomer or an unsaturated pre-polymer during its polymerization.

As a cross-linking agent, mention may notably be made of diacrylates, like 1'1,6-hexanediol diacrylate.

By "photo-initiator", is meant a compound capable of fragmenting under the effect of light radiation and of initiating polymerization of an unsaturated monomer or of an unsaturated pre-polymer.

The photo-initiators which may be used according to the present invention are known in the art and are described, for example in "Les photoinitiateurs dans la réticulation des revêtements" (photo-initiators in the cross-linking of coatings), G. Li Bassi, Double Liaison—Chimie des Peintures, no. 361, (double bond—chemistry of paints), November 1985, p. 34-41; "Applications industrielles de la polymérisation photoinduite", (Industrial applications of photo-induced polymerization) Henri Strub, L'Actualite Chimique, February 2000, p. 5-13; and "Photopolymères: considérations théoriques et réaction de prise" (photopolymers theoretical considerations and setting reaction), Marc, J. M. Abadie, Double Liaison—Chimie des Peintures, nos. 435-436, 1992, p. 28-34.

These photo-initiators encompass:

α-hydroxycketones, for example marketed under the names of DAROCUR® 1173 and 4265, IRGACURE® 184, 2959, and 500 by BASF, and ADDITOL® CPK by CYTEC, α-aminoketones, for example marketed under the names of IRGACURE® 907 and 369 by BASF, aromatic ketones for example marketed under the name of ESACURE® TZT by LAMBERTI. Mention may also be made of thioxanthones for example marketed under the name of ESACURE® ITX by LAMBERTI, and quinones. These aromatic ketones most often require the presence of a hydrogen donor compound such as tertiary amines and notably alkanolamines. Mention may notably be made of the tertiary amine ESACURE® EDB marketed by LAMBERTI.

α-dicarbonyl derivatives for which the most common representative is benzyldimethylcetal marketed under the name of IRGACURE® 651 by BASF. Other commercial products are marketed by LAMBERTI under the name of ESACURE® KB1, and acylphosphine oxides, such as for example bis-acylphosphine oxides (BAPO) for example marketed under the names of IRGACURE® 819, 1700, and 1800, DAROCUR® 4265, LUCIRIN® TPO, and LUCIRIN® TPO-L by BASF.

Preferably, the composition C3 comprises:
a polyurethane pre-polymer bearing acrylate functions,
alkylenediol diacrylate, and
a photo-initiator of the α-hydroxyketone type.

According to a preferred embodiment, the composition C3 is intended to form, once it is polymerized during step d), a casing of polyacrylate.

According to an embodiment, the composition C3 comprises oligomers of the polyester or polyurethane or polyurea or polyether or polydimethylsiloxane type, bearing terminal or pendent acrylate functions, as well as a photo-initiator.

According to an embodiment, the composition C3 comprises unsaturated polyester oligomers of styrene, as well as a photo-initiator.

According to an embodiment, the composition C3 comprises mercaptoesters and thiolenes, and a photo-initiator.

According to an embodiment, the composition C3 comprises multifunctional epoxides or cyclic ethers or cyclic siloxanes or oxetanes, or vinyl ethers, as well as a cationic photo-initiator.

Step c)

During step c), the emulsion obtained at the end of step b) is preferably added drop wise to a liquid composition C4 brought to the temperature T4.

At temperature T4, the compositions C3 and C4 are not miscible with each other. Thus, when the C1-in-C2-in-C3 emulsion comes into contact with the composition C4 with stirring, so called triple drops are formed.

In FIGS. 1 and 2, the drops 20 and 25 are schematic representations of triple drops which may be obtained.

According to an embodiment, a formed triple drop corresponds to a double drop formed earlier, surrounded with an external casing of composition C3 positioned around said double drop, said triple drop being dispersed in the composition C4. The obtained emulsion is also called «a triple emulsion» or a C1-in-C2-in-C3-in-C4 emulsion.

According to this embodiment, when the double drop comprises a single drop of composition C1 as a core, the triple drop obtained has a core consisting of a drop of composition C1, an internal casing of composition C2 positioned around said core, and an external casing of composition C3 positioned around said internal casing, said drops being dispersed in the composition C4.

According to this embodiment, when the double drop comprises several drops of composition C1 as a core, the triple drop obtained has a core consisting of several drops of composition C1, surrounded with a single and same internal casing of composition C2 positioned around said core, and an external casing of composition C3 positioned around said internal casing, said drops being dispersed in the composition C4.

According to another embodiment, a triple drop formed corresponds to several double drops formed earlier, surrounded with a single and same external casing of composition C3 positioned around said double drops, said triple drop being dispersed in the composition C4.

By "external casing positioned around said internal casing", is meant that the external casing surrounds (or encircles), preferably totally, said internal casing so that the latter cannot escape from the enclosure formed by said external casing. Preferably, the external casing which surrounds said internal casing is positioned at its contact. It is also stated that the internal casing is "encapsulated" in the external casing.

Preferably, at temperature T4, the compositions C4 and C2 are not miscible with each other. This has the advantage of avoiding that the triple drops formed destabilize in the case of rupture or destabilization of the casing of composition C3, which would cause a leak of the compound A and a contamination of the composition C4.

At temperature T4, the compositions C4 and C1 may be either miscible with each other or not.

In order to apply step c), it is possible to use any type of stirrer usually used for forming emulsions, like for example a homogenizer with ultrasonic waves, a homogenizer with a membrane, a homogenizer at high pressure, a colloidal mill, a disperser with a high shearing power or a homogenizer at high speed.

Before adding the emulsion C1-in-C2-in-C3, the composition C4 is brought to a temperature T4 such that the composition C4 is in liquid form, said temperature T4 being less than or equal to temperature T2 and less than or equal to temperature T3.

According to an embodiment, the temperature T4 is less by at least 10° C., or even by at least 15° C., than the temperatures T2 and T3.

Typically, the temperature T4 is less than or equal to 30° C., preferably comprised from 0° C. to 30° C., preferentially from 15° C. to 30° C.

The temperature T4 is for example comprised from 20° C. to 25° C.

According to another embodiment, the temperature T4 is equal to T2 and/or to T3.

In this case, T4 is typically equal to room temperature (comprised between 20° C. and 25° C.).

When T4 is less than the temperature of the emulsion C1-in-C2-in-C3, when said emulsion comes into contact with said composition C4, the temperature of the thermo-expansible material decreases, so that the casing of composition C2 contracts. The casing of liquid composition C3 which encapsulates the casing of composition C2 is in a non-polymerized state and follows the variation in volume of the casing which it encapsulates.

Preferably, by passing at temperature T4, the composition C2 contracts and solidifies. This is notably the case when the composition C2 comprises, as a thermo-expansible material, a material (such as a wax) having a melting point comprised between T4 and T2.

When T4 is equal to T2 and to T3, the composition C2 does not contract and there is no change in state of the thermo-expansible material.

This is typically the case when the thermo-expansible material is a fluorocarbon for which the melting point is less than or equal to T4 (or therefore T2).

Preferably at temperature T4, the composition C4 has a viscosity of less than or equal to that of the composition C3.

Preferably, at temperature T4, the composition C4 has a viscosity of less than or equal to that of the composition C2.

Preferably, at temperature T4, the composition C4 has a viscosity greater than or equal to that of the composition C1.

Preferably, at temperature T4, the composition C4 has a viscosity of less than or equal to that of the emulsion C1-in-C2-in-C3. This gives the possibility of avoiding phase inversion phenomena.

According to an embodiment, the composition C4 is without any reactive compound.

According to this embodiment, the composition C4 typically has the same composition as the solvent or mixture of solvents in which the compound A is solubilized within the composition C1.

According to another embodiment, the composition C4 comprises at least one compound B, different from the compound A, able to react with the compound A.

According to this embodiment, the composition C4 is typically a solution comprising an organic solvent or a mixture of organic solvents in which the compound B is in a soluble form.

The compound B may be present according to a content from 0.01% to 100% by weight based on the total weight of the composition C4.

The dilution of the compound B in the composition C4 is adapted according to the sought viscosity for this composition.

The compound B may be a catalyst, a monomer, a pre-polymer, a cross-linking agent.

Step d)

During step d), the composition C3 is polymerized (and the composition C'3 when the latter is present), more specifically the casing of composition C3 (and the casing of composition C'3 when the latter is present), for rigidifying the drops of the C1-in-C2-in-C3-in-C4 emulsion obtained at the end of step c) and obtaining solid capsules.

A polymerized rigid external casing is thereby formed, also called a polymeric shell or matrix, around the drops. The objects formed then relate to solid capsules having a rigid shell which gives the possibility of stabilizing the internal structure and of maintaining the insulation of the compound A contained in the core. The structure of the obtained capsules gives the possibility of avoiding any destabilization or any leak of the compound A over time, as long as no substantial rise in temperature is imposed.

In the embodiments where the drops have a few polymerizable composition C3 casings, during step d) as many polymerized casings are formed.

The solid capsules obtained may remain in suspension in the bulk formed by the composition C4 until the moment selected for release of the compound A.

The solid capsules obtained have the advantage of having several (at least 2) casings between the core containing the compound A and the external medium (from which the compound A has to be isolated), which gives the possibility of avoiding any contamination of the external medium. Because of the imperviousness of the casings, the compound A is advantageously insulated from the external medium within the obtained capsules, which gives the possibility of avoiding any undesired reaction.

Further, even if one of the casings of the capsules is destabilized (typically a casing of composition C2), the core of the capsules will any how be retained by the other casing(s) (notably the polymerized rigid external casing).

Unlike the existing methods, the method of the invention gives the possibility of reducing the costs associated with the separation of the compounds in separate conditionings.

Further, the method of the present invention is based on a bulk technology, which is compatible with the volume constraints of the industrial scale.

A means for releasing the compound A is to heat the solid capsules, which thermally expands the casing of composition C2 comprising the thermo-expansible material, thereby imposing a mechanical stress on the polymerized rigid casing(s) of the solid capsules.

According to an embodiment, the step d) is carried out by exposing the drops obtained at the end of step c) to light radiation able to polymerize the composition C3 (and the optionally present composition C'3).

According to an embodiment, the solid capsules obtained at the end of step d) are without any water and/or any surfactant.

The method of the invention has the advantage of not requiring any water, in none of the described steps. The method of the invention thereby gives the possibility of encapsulating compounds sensitive to water.

The method of the invention has the advantage of not requiring any surfactant, in none of the described steps. The method of the invention thereby gives the possibility of reducing the presence of additives which may modify the properties of the final product obtained after release of the compound A.

The size of the solid capsules depends on the type, on the geometry, and on the speed of the apparatus used for emulsifying, but also on the viscosity of the compositions and of the delay between step c) and step d). One skilled in the art may adapt these parameters according to the desired average size of particles.

The average size of the solid capsules which may be obtained according to the method of the invention is generally comprised from 0.1 μm to 100 μm.

The size of the solid capsules is typically measured by using an optical microscope or a transmission electron microscope, and a piece of image processing software. Alternatively, it is possible to use other measurement techniques, based on centrifugation or dynamic diffusion of light.

In order to apply steps a), b) and c), a stirrer of the high speed homogenizer type is typically used, for example a T 25 ULTRA-TURRAX from IKA.

The mass ratios between the compositions C1, C2, C3 and C4 may be adapted by one skilled in the art depending on the viscosity of the compositions, on the stability of the emulsions, on the size of the desired capsules, and on the desired concentration of compound A in the final mixture stemming from step d).

Typically, the mass ratio C1:C2 is comprised from 0.01 to 5.0, preferably from 0.1 to 1.0, preferentially from 0.1 to 0.5. The mass ratio C1:C2 is for example equal to 0.25.

Typically, the mass ratio C2:C3 is comprised from 0.1 to 20.0, preferably from 1.0 to 10.0, preferentially from 1.0 to 5.0. The mass ratio C2:C3 is for example equal to 2.0.

Typically, the mass ratio C3:C4 is comprised from 0.1 to 20.0, preferably from 1.0 to 10.0, preferentially from 1.0 to 5.0. The mass ratio C2:C3 is for example equal to 2.0.

Typically, the mass ratio (C1+C2+C3):C4 is comprised from $10^{-5}$ to 1.0, preferably from $10^{-4}$ to 1.0, preferentially from $10^{-3}$ to 1.0, or even from 0.01 to 1.0, notably from 0.1 to 1.0.

Capsules

According to another object, the present invention relates to solid capsules which may be obtained by the method of the invention.

The present invention notably relates to solid capsules which may be obtained by the first alternative of the method of the invention defined above, said capsules comprising:
a core comprising a solution comprising the compound A,
an internal casing comprising a thermo-expansible material, positioned around said core, and
a polymerized rigid external casing positioned around said internal casing.

Figure 3:
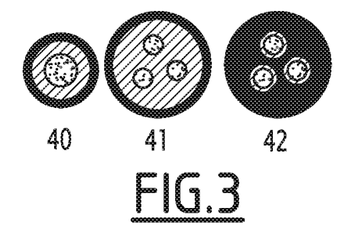
FIGS. 3, 4 and 5 schematically represent solid capsules 40-41-42, 50-51-52, and 60-61-62 obtained according to the first, second and third alternative of the method of the invention, respectively. In these figures, the areas in dotted lines represent the composition C1 containing the compound A, the hatched areas represent the casings of composition C2 comprising the thermo-expansible material and the black areas represent the rigid polymerized casings.

According to an embodiment, the solid capsules which may be obtained by the first alternative of the method of the invention comprise a core formed with a single drop, surrounded by a single internal casing, itself surrounded with a single polymerized rigid external casing. FIG. 3 schematically represents a solid capsule obtained according to this embodiment (capsule 40).

According to another embodiment, the solid capsules which may be obtained by the first alternative of the method of the invention comprise a core formed with several drops, said drops being surrounded by a single and same internal casing, itself surrounded with a single polymerized rigid external casing. FIG. 3 schematically represents a solid capsule obtained according to this embodiment (capsule 41).

According to another embodiment, the solid capsules which may be obtained by the first alternative of the method of the invention comprise a core formed with several drops, each of said drops being surrounded by a distinct internal casing, said internal casings being surrounded with a single polymerized rigid external casing. FIG. 3 schematically represents a solid capsule obtained according to this embodiment (capsule 42).

According to a preferred embodiment, the polymerized rigid external casing mentioned above of the solid capsules which may be obtained by the first alternative of the method of the invention is not obtained by coacervation. Preferably, said polymerized rigid external casing therefore does not comprise any coacervate and is therefore not formed by a coacervate.

According to an embodiment, this polymerized rigid external casing is a cross-linked rigid external casing, and therefore obtained by cross-linking.

Preferably, the polymerized rigid external casing of these solid capsules is obtained by polymerization of at least one unsaturated monomer or of an unsaturated pre-polymer, a cross-linking agent and a photo-initiator, as defined above.

According to an embodiment, the aforementioned solid capsules, which may be obtained by the first alternative of the method of the invention, comprise an internal casing as defined below in which the thermo-expansible material is selected from the group formed with waxes, fluorocarbons and mixtures thereof, as described above.

According to the invention, the term of «rigid casing» refers to a casing having particular mechanical properties, i.e. preferably having a Young modulus of at least 50 MPa, and preferentially comprised between 50 MPa and 500 GPa.

The present invention also relates to solid capsules which may be obtained by the second alternative of the method of the invention defined above, said capsules comprising:
a core comprising a solution comprising the compound A,
a polymerized rigid internal casing positioned around said core,
an intermediate casing comprising a thermo-expansible material, positioned around said polymerized rigid internal casing, and
a polymerized rigid external casing positioned around said intermediate casing.

Figure 4:
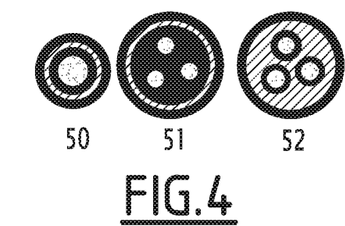

According to an embodiment, the solid capsules which may be obtained by the second alternative of the method of the invention comprise a core formed with a single drop, surrounded with a single polymerized rigid internal casing, itself surrounded with a single intermediate casing, itself surrounded with a single polymerized rigid external casing. FIG. 4 schematically represents a solid capsule obtained according to this embodiment (capsule 50).

According to another embodiment, the solid capsules which may be obtained by the second alternative of the method of the invention comprise a core formed with several drops, said drops being surrounded with a single and same polymerized rigid internal casing, itself surrounded with a single intermediate casing, itself surrounded with a single polymerized rigid external casing. FIG. 4 schematically represents a solid capsule obtained according to this embodiment (capsule 51).

According to another embodiment, the solid capsules which may be obtained by the second alternative of the method of the invention comprises a core formed with several drops, each of said drops being surrounded with a distinct polymerized rigid internal casing, said internal casings being surrounded with a single intermediate casing, itself surrounded with a single polymerized rigid external casing. FIG. 4 schematically represents a solid capsule obtained according to this embodiment (capsule 52).

According to an embodiment, the aforementioned solid capsules, which may be obtained by the second alternative of the method of the invention, comprise an intermediate casing as defined above wherein the thermo-expansible material is selected from the group consisting of waxes, fluorocarbons and of mixtures thereof, as described above.

The present invention also relates to solid capsules which may be obtained by the third alternative of the method of the invention defined above, said capsules comprising:
a core comprising a solution comprising the compound A, and
a stack of casings comprising a thermo-expansible material and polymerized rigid casings, said casings being alternately positioned around said core.

FIG. 5 schematically represents examples of capsules which may be obtained according to this alternative of the method (capsules 60, 61 and 62).

Composition

According to another object, the present invention relates to a composition comprising solid capsules which may be obtained by the method of the invention.

The present invention thus relates to a composition comprising at least one solid capsule obtained according to one of the alternatives of the method of the invention, said capsule being dispersed in a continuous liquid phase, preferably corresponding to the composition C4 defined above.

Alternatively, the capsules are in suspension in a continuous liquid phase which differs from the composition C4 used in step c) of the method.

According to a preferred embodiment, the continuous liquid phase comprises at least one compound B, different from the compound A, able to react with the compound A.

According to this embodiment, the method of the invention has the advantage of allowing both compounds A and B to be present in the same formulation without reacting, until a trigger is applied for initiating the release of the encapsulated compound A and thus the reaction between said two compounds A and B.

Thus, the method of the invention also gives the possibility of ensuring that the compounds A and B are finally put into presence according to the optimum concentration, by minimizing the dosage errors of the user.

The pairs of A/B compounds applied in the method of the invention are for example epoxy resin/hardener pairs, monomer/polymerization catalyst pairs, or monomer M1/monomer M2 pairs, M1 and M2 being able to polymerize the whole.

The compounds A which may be used within the scope of the present invention are for example isocyanate compounds, β-hydroxyl alkylamides, trimellitic glycidyl esters, and melamines and their etherified derivatives.

The compounds B which may be used within the scope of the present invention are for example polyamides, polyamines, polyesters with a hydroxy function, polyethers, and polyurethanes.

According to an embodiment, the compound A is a catalyst able to cross-link the compound B.

As an example of a catalyst which may be used as a compound A, mention may be made of:
- peroxides and hydroperoxides, able to cross-link unsaturated polyesters,
- the hardeners of the amine type, such as polyamines and polyaminoamines, anhydrides like for example phthalic anhydride, and thiols, able to cross-link epoxy resins,
- metal catalysts, like dibutyltin dilaurate, able to cross-link polyesters and/or polyisocyanates,
- substituted hydroxymethylphenols and substituted aminomethylphenols, able to cross-link epoxies and/or polyurethanes, and
- organometal catalysts, like organostannic agents, bismuth carboxylates, organotitanium agents, zinc acetylacetonates, and aluminium acetylacetonates, able to cross-link silicone gums.

The method of the present invention applies to all the reactions in which it is necessary that at least two compounds are stored separately and mixed at the moment of use, like for example kits of catalyst and elastomers and kits of dyes for hair.

The method of the invention is notably applicable in the field of production of chemical products, coloring agents, cosmetic products, perfumes, in the automotive industry, and paints.

Release Method

According to another object, the present invention relates to a method for releasing an encapsulated compound A into capsules according to the invention.

The present invention relates to a method for releasing a compound A, comprising a heating step to a temperature T greater than T4 of a composition according to the invention.

This heating step at temperature T greater than T4 is able to thermally expand the thermo-expansible material of the composition C2.

Typically, the release temperature T is greater by at least 20° C. to the temperature T4.

Preferably, the release temperature T is greater than or equal to T2.

The present invention therefore has the advantage of only requiring a rise in temperature for allowing release of the compound A according to the release method of the invention. Indeed, a simple rise in temperature causes thermal expansion of the thermo-expansible material present in the casing(s) of composition C2 of the capsules, which imposes a mechanical stress on the polymerized rigid casing(s). This mechanical stress is expressed by perviousness (increase in perviousness) and/or a fragmentation (mechanical rupture) of these rigid casing(s) (which themselves cannot expand thermally), allowing the release of the compound A contained in the core of the capsules.

In the cases when the composition C2 is solid at temperature T4 (typically at room temperature), T is preferably greater than or equal to the melting point of the thermo-expansible material, so that the latter is subject to a change in state from solid→liquid, causing a thermal expansion able to fragment the polymerized rigid casing. This is typically the case when the thermo-expansible material is a solid wax at temperature T4. Nevertheless, it is possible to apply the release method at a temperature T of less than the melting point of the thermo-expansible material.

In the cases when the composition C2 is liquid at temperature T4 (typically at room temperature), T is preferably greater than or equal to the boiling point of the thermo-expansible material, so that the latter has a change in state liquid 4 gas causing a thermal expansion able to fragment the polymerized rigid casing. This is typically the case when the thermo-expansible material is a liquid fluorocarbon at temperature T4.

Nevertheless, it is possible to apply the release method at a temperature T of less than the boiling point of the thermo-expansible material.

The present invention thus gives the possibility of thermally initiating the reaction between an encapsulated compound A and a compound B contained in the continuous phase of a composition as described above, with the advantage of ensuring control of the required temperature for initiating the reaction.

The triggering of the release may be an overall increase in the temperature of the composition, or a localized increase in temperature at the casing(s) of composition C2 comprising the thermo-expansible material.

Typically, the temperature T is greater than or equal to 60° C., preferably greater than or equal to 70° C., advantageously greater than or equal to 80° C., for example greater than or equal to 90° C.

Typically, the temperature T is comprised from 50° C. to 200° C., preferably from 60° C. to 150° C., preferentially from 70° C. to 120° C.

The heating step may last for 5 minutes to several hours, for example 1 hour or 2 hours.

BRIEF DESCRIPTION OF THE DRAWINGS

During the first step (step a), a composition C1 is added with stirring into a composition C2, in order to obtain drops 1 dispersed in the composition C2. During the second step (step b), the emulsion obtained earlier is added with stirring into a composition C3, in order to obtain drops 10 dispersed in the composition C3. During the third step (step c), the emulsion obtained earlier is added with stirring into a composition C4, in order to obtain drops 20 dispersed in the composition C4. During the fourth step (step d), the composition C3 is polymerized, whereby solid capsules 30 according to the invention are obtained.

During the first step (step a), a composition C1 is added with stirring (dispersion of drops comprising the compound A in a composition C'3) into a composition C2, in order to obtain drops 5 dispersed in the composition C2. During the second step (step b), the emulsion obtained earlier is added with stirring into a composition C3, in order to obtain drops 15 dispersed in the composition C3. During the third step (step c), the emulsion obtained earlier is added with stirring into a composition C4, in order to obtain drops 25 dispersed in the composition C4. During the fourth step (step d), the composition C3 is polymerized, whereby solid capsules 35 according to the invention are obtained.

EXAMPLES

Example 1—Preparation of Capsules According to the Invention

1. Capsules According to the First Alternative of the Method

This example applied the first alternative of the method according to the invention and is directed to formulate in a single and same formulation, the kit with 2 components "SYLGARD® 184 Silicone Elastomer" marketed by DOW CORNING.

This kit consists of two components and comprises, on the one hand, a composition of siloxane and, on the other hand, a composition comprising a catalyst which is normally to be mixed with the siloxane composition for cross-linking it. Thus, if both components are mixed, a solid polymeric matrix is formed in less than 24 hours at room temperature.

In this example, the composition C1 corresponded to the first component of the kit above (siloxane composition) and the composition C4 corresponded to the second component of the kit above (catalyst composition):

Composition C1 (component no. 1 of the kit SYLGARD® 184 Silicone Elastomer):
55.0%-75.0% of dimethyl, methylhydrogen siloxane,
15.0%-35.0% of dimethyl siloxane, with dimethylvinyl termination,
10.0%-30.0% of dimethylvinyl and trimethyl silica,
1.0%-5.0% of tetramethyl tetravinyl cyclotetrasiloxane, and
less than 0.10% of ethylbenzene.

Composition C4 (component no. 2 of the kit SYLGARD® 184 Silicone Elastomer):
platinum complex (<200 ppm),
55.0%-75.0% of dimethyl Siloxane, with dimethylvinyl termination,
30.0%-50.0% of dimethylvinyl and trimethyl silica,
<1.0% of tetra(trimethylsiloxy)silane,
0.5% of xylene, and
0.2% of ethylbenzene.

The compositions C2 and C3 are the following compositions:

Composition C2:
50% of Synton® PAO 100, and
50% of Suppocire DM Tablets.

Composition C3:
10% of 1,6-hexanediol diacrylate,
89% of aliphatic polyurethane diacrylate, and
1% of Darocure 1173.

For this example, a stirrer T 25 ULTRA-TURRAX from IKA was used for forming the emulsions.

Step a): 1 g of composition C1 was added drop wise to 4 g of composition C2, with stirring, at temperature T2=40° C., whereby an emulsion of droplets of composition C1 in the composition C2 was obtained.

Step b): This emulsion was then added drop wise to 2 g of composition C3, with stirring, at temperature T3=40° C., whereby a C1-in-C2-in-C3 emulsion was obtained.

Step c): This emulsion was then added drop wise to 10 g of composition C4, with stirring, at temperature T4=25° C., whereby a C1-in-C2-in-C3-in-C4 emulsion was obtained.

Step d): This emulsion was then subject to radiation from a UV lamp (Light Box—Dymax Light Curing System, Model 2000 Flood) of 400 Watts (315-395 nm), with a light intensity of 0.1 W/cm², for 3 minutes, which cause polymerization of the external casing of composition C3 of the drops of the emulsion.

The solid capsules were observed by means of an Olympus IX71 microscope, equipped with an objective UPlanSApo 100×/1.4, and by means of a transmission electron microscope JEOL JEM 2010F. The average size of the solid capsules was measured by means of an Image J piece of software and is of 2.5 μm±1.5 μm.

2. Capsules According to the Second Alternative of the Method

This example applied the second alternative of the method according to the invention and aimed to formulate in a single and same formulation, the kit with 2 components «SYLGARD® 184 Silicone Elastomer» marketed by DOW CORNING.

The compositions C2, C3 and C4 used were the same as in example 1.1 above.

However, the composition C1 was dispersed beforehand in the composition C3: 1 g of composition C1 was added drop wise to 1 g of composition C3, with stirring, whereby an emulsion of droplets of composition C1 in the composition C3 was obtained.

For this example, a stirrer T 25 ULTRA-TURRAX from IKA was used for forming the emulsions.

Step a): The thereby obtained emulsion was added drop wise to 4 g of composition C2, with stirring, at temperature T2=40° C., whereby a C1-in-C3-in-C2 emulsion was obtained.

Step b): This emulsion was then added drop wise to 1 g of composition C3, with stirring, at temperature T3=40° C., whereby a C1-in-C3-in-C2-in-C3 emulsion was obtained.

Step c): This emulsion was then added drop wise to 10 g of composition C4, with stirring, at temperature T4=25° C., whereby a C1-in-C3-in-C2-in-C3-in-C4 emulsion was obtained.

Step d): This emulsion was then subject to the radiation from a UV lamp (Light Box—Dymax Light Curing System, Model 2000 Flood) of 400 Watts (315-395 nm), with a light intensity of 0.1 W/cm$^2$, for 3 minutes, which caused polymerization of the casings of composition C3 of the drops of the emulsion.

3. Capsules According to the Third Alternative of the Method

This example applied the third alternative of the method according to the invention and aimed at formulating in a single and same formulation the kit with 2 components «SYLGARD® 184 Silicone Elastomer» marketed by DOW CORNING.

The compositions C1, C2, C3 and C4 used were the same as in example 1.1 above.

For this example, a stirrer T 25 ULTRA-TURRAX from IKA was used for forming the emulsions.

Step a): 1 g of composition C1 was added drop wise to 1 g of composition C2, with stirring, at temperature T2=40° C., whereby a C1-in-C2 emulsion of droplets of composition C1 in the composition C2 was obtained.

Step b): This emulsion was then added drop wise to 1 g of composition C3, with stirring, at temperature T3=40° C., whereby a C1-in-C2-in-C3 emulsion was obtained.

Step a) was repeated: This emulsion was then added drop wise to 1 g of composition C2, with stirring, at temperature T2=40° C., whereby a C1-in-C2-in-C3-in-C2 emulsion was obtained.

Step b) was repeated: This emulsion was then added drop wise to 1 g of composition C3, with stirring, at temperature T3=40° C., whereby a C1-in-C2-in-C3-in-C2-in-C3 emulsion was obtained.

Step c): This emulsion was then added drop wise to 10 g of composition C4, with stirring, at temperature T4=25° C., whereby a C1-in-C2-in-C3-in-C2-in-C3-in-C4 emulsion was obtained.

Step d): This emulsion was then subject to radiation from a UV lamp (Light Box—Dymax Light Curing System, Model 2000 Flood) of 400 Watts (315-395 nm), with a light intensity of 0.1 W/cm$^2$, for 3 minutes, which cause polymerization of the casings of composition C3 of the drops of the emulsion.

Example 2—Stability of the Capsules According to the Invention

The viscosity of the compositions obtained at the end of step d) of examples 1.1, 1.2 and 1.3 were measured over time in order to check that the encapsulated composition C1 in the core of the capsules remained therein well confined and in particular it did not encounter the composition C4.

The viscosity was measured at 25° C. with a rheometer HAAKE™ Rheostress 600 over 30 days and no variation was observed, showing that no leak of composition C1 had taken place.

On the 30$^{th}$ day, the compositions were brought to 90° C. for 2 h with view to releasing the composition C1. At the end of this heating, the viscosity could not be measured since the compositions had polymerized.

Example 3—Fragmentation of the Capsules According to the Invention

The composition obtained in example 1.1 was observed under a microscope (Olympus IX71 microscope equipped with an objective UPlanSApo 100×/1.4).

Before heating the composition (2 h at 90° C.), the capsules were intact.

After heating (2 h at 90° C.), the capsules were fragmented.

Comparative Example 4

Comparative capsules obtained according to a method not compliant with the invention were also prepared.

According to a first comparative test, capsules were prepared by following the method of example 1 except for steps c) and d). These capsules therefore did not have any polymerized rigid external casing. Left at room temperature, the obtained composition polymerize as soon as the 2$^{nd}$ day.

According to a second comparative test, capsules were prepared by following the method of example 1 except for step b). These capsules therefore did not have any thermo-expansible casing. Left at room temperature, the obtained composition polymerize as soon as the 5$^{th}$ day.

What is claimed is:

1. A solid capsule comprising:
   a core comprising a solution comprising a compound A,
   an internal casing comprising a thermo-expansible material, positioned around said core, wherein the thermo-expansible material is one or more waxes, and
   a polymerized rigid external casing positioned around said internal casing, said polymerized rigid external casing not being obtained by coacervation, said solid capsule being obtained according to a method comprising:
   a) adding with stirring a composition C1 comprising at least the compound A, in a liquid composition C2 comprising the thermo-expansible material,
      C1 and C2 not being miscible with each other,
      C2 being at temperature T2,
      whereby an emulsion is obtained comprising drops of composition C1 dispersed in the composition C2,
   b) addition with stirring of the emulsion obtained in a) into a liquid composition C3 able to be polymerized,
      C3 and C2 not being miscible with each other,
      C3 being at temperature T3,
      whereby an emulsion is obtained comprising drops dispersed in the composition C3,
   c) addition with stirring of the emulsion obtained in b) in a liquid composition C4,
      C4 and C3 not being miscible with each other,
      C4 being at temperature T4 less than or equal to T2 and less than or equal to T3,
      whereby an emulsion is obtained comprising drops dispersed in the composition C4, and
   d) polymerization of the drops obtained in c).

2. A solid capsule comprising:
   a core comprising a solution comprising a compound A,
   a polymerized rigid internal casing positioned around said core, an intermediate casing comprising a thermo-expansible material, positioned around said polymerized rigid internal casing, wherein the thermo-expansible material is one or more waxes, and a polymerized rigid external casing positioned around said intermediate casing, said solid capsule being obtained according to a method comprising:

a) adding with stirring a composition C1 comprising at least the compound A, in a liquid composition C2 comprising the thermo-expansible material,
C1 and C2 not being miscible with each other,
C2 being at temperature T2,
whereby an emulsion is obtained comprising drops of composition C1 dispersed in the composition C2, b) addition with stirring of the emulsion obtained in a) into a liquid composition C3 able to be polymerized,
C3 and C2 not being miscible with each other,
C3 being at temperature T3,
whereby an emulsion is obtained comprising drops dispersed in the composition C3, c) addition with stirring of the emulsion obtained in b) in a liquid composition C4,
C4 and C3 not being miscible with each other,
C4 being at temperature T4 less than or equal to T2 and less than or equal to T3,
whereby an emulsion is obtained comprising drops dispersed in the composition C4, and d) polymerization of the drops obtained in c).

3. A composition comprising at least one solid capsule according to claim 1, said capsule being dispersed in a continuous liquid phase.

4. A composition comprising at least one solid capsule according to claim 1, said capsule being dispersed in a continuous liquid phase, wherein the continuous liquid phase comprises at least one compound B that is different from compound A, and wherein compound B is able to react with compound A.

5. A release method for a compound, said method comprising heating the composition according to claim 4 to a temperature T greater than T4, wherein the compound of the release method is compound A.

6. A composition comprising at least one solid capsule according to claim 2, said capsule being dispersed in a continuous liquid phase.

7. The solid capsule of claim 1, wherein the composition C1 is a solution comprising the compound A in a solubilized form or the composition C1 is an emulsion formed with drops of a solution comprising the compound A in a solubilized form, said drops being dispersed in a composition C'3 able to be polymerized.

8. The solid capsule of claim 1, wherein the thermo-expansible material is a hydrocarbon wax, of plant, mineral, animal and/or synthetic origin.

9. The solid capsule of claim 1, wherein the thermo-expansible material comprises a wax selected from the group consisting of mono-, di- and tri-esters of glycerol and of fatty acids having a linear or branched hydrocarbon chain comprising from 8 to 24 carbon atoms, and mixtures thereof.

10. The solid capsule of claim 1, wherein the composition C3 comprises at least one unsaturated monomer or one unsaturated pre-polymer, optionally bearing (meth)acrylate functions, a cross-linking agent and a photo-initiator.

11. The solid capsule of claim 1, wherein d) is carried out by exposure of the drops obtained at the end of c) to light radiation able to polymerize the composition C3.

12. The solid capsule of claim 1, wherein temperature T3 is equal to temperature T2.

13. The solid capsule of claim 2, wherein the composition C1 is a solution comprising the compound A in a solubilized form or the composition C1 is an emulsion formed with drops of a solution comprising the compound A in a solubilized form, said drops being dispersed in a composition C'3 able to be polymerized.

14. The solid capsule of claim 2, wherein the thermo-expansible material is a hydrocarbon wax, of plant, mineral, animal and/or synthetic origin.

15. The solid capsule of claim 2, wherein the thermo-expansible material comprises a wax selected from the group consisting of mono-, di- and tri-esters of glycerol and of fatty acids having a linear or branched hydrocarbon chain comprising from 8 to 24 carbon atoms, and mixtures thereof.

16. The solid capsule of claim 2, wherein the composition C3 comprises at least one unsaturated monomer or one unsaturated pre-polymer, optionally bearing (meth)acrylate functions, a cross-linking agent and a photo-initiator.

17. The solid capsule of claim 2, wherein d) is carried out by exposure of the drops obtained at the end of c) to light radiation able to polymerize the composition C3.

18. The solid capsule of claim 2, wherein temperature T3 is equal to temperature T2.

* * * * *